(12) United States Patent
Holmes et al.

(10) Patent No.: US 9,482,330 B1
(45) Date of Patent: Nov. 1, 2016

(54) HYBRID TRANSMISSION

(71) Applicant: GM GLOBAL TECHNOLOGY OPERATIONS LLC, Detroit, MI (US)

(72) Inventors: Alan G. Holmes, Clarkston, MI (US); Norman K. Bucknor, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 2 days.

(21) Appl. No.: 14/710,045

(22) Filed: May 12, 2015

(51) Int. Cl.
 *F16H 3/72* (2006.01)
 *F16H 37/08* (2006.01)
 *F16H 1/02* (2006.01)
 *F16H 1/28* (2006.01)

(52) U.S. Cl.
 CPC ............ *F16H 37/0833* (2013.01); *F16H 1/02* (2013.01); *F16H 1/28* (2013.01)

(58) Field of Classification Search
 CPC ......... F16H 37/0833; F16H 1/28; F16H 1/02
 See application file for complete search history.

(56) References Cited

U.S. PATENT DOCUMENTS

| | | | |
|---|---|---|---|
| 3,069,577 A | 12/1962 | Lee | |
| 7,110,867 B2* | 9/2006 | Imazu | B60K 6/445 180/65.1 |
| 7,240,751 B2* | 7/2007 | Hoare | B60K 6/26 180/65.1 |
| 8,167,063 B2* | 5/2012 | Abe | B60K 6/448 180/65.24 |
| 8,177,007 B2* | 5/2012 | Abe | B60K 1/02 180/65.265 |
| 8,358,044 B2 | 1/2013 | Waszak et al. | |
| 8,430,782 B2* | 4/2013 | Akutsu | B60K 6/26 475/269 |
| 9,102,227 B2* | 8/2015 | Yang | B60K 6/547 |
| 2003/0176955 A1* | 9/2003 | Minagawa | B60K 6/365 701/22 |
| 2003/0181276 A1* | 9/2003 | Minagawa | B60K 6/445 475/5 |
| 2007/0129198 A1* | 6/2007 | Atarashi | H02K 7/116 475/5 |
| 2015/0037180 A1 | 2/2015 | Abbott | |

OTHER PUBLICATIONS

C.Kirby, S.Calverley, D.Latimer; "Magsplit"; SAE 2014 Hybrid and Electric Vehicle Technologies Symposium Feb. 11-13, 2014, Hilton La Jolla Torrey Pines—La Jolla, California, USA.

* cited by examiner

*Primary Examiner* — David J Hlavka
(74) *Attorney, Agent, or Firm* — Quinn Law Group, PLLC

(57) ABSTRACT

A transmission for transferring mechanical power between an input member and an output member is described, and includes a first synchronous electric machine including a first stator, a first distal rotor and a first proximal rotor and a second synchronous electric machine including a second stator, a second distal rotor and a second proximal rotor. The input member rotatably couples to the first distal rotor and to the second proximal rotor and the output member rotatably couples to the second distal rotor and to the first proximal rotor. Mechanical power is transferrable between the input member and the output member without torque being applied by the first stator.

12 Claims, 6 Drawing Sheets

US 9,482,330 B1

HYBRID TRANSMISSION

TECHNICAL FIELD

The disclosure relates to hybrid transmission devices, and more specifically to power-split hybrid transmissions employing electric machines.

BACKGROUND

Electric machines, e.g., motor/generators may be used with internal combustion engines in hybrid propulsion systems. One such propulsion system includes a power-split hybrid transmission, wherein shaft power from an engine is combined with shaft power flowing to and from an electric machine to power an output member at a rotational speed that is independent of the speed of the engine shaft. In order to combine power from a high-speed, rotating electric machine with power from a high-torque, lower speed mechanical component such as an engine, mechanical planetary gearing may be coupled to the electric machine. Mechanical planetary gearing may have disadvantages such as, for example, acoustic noise, sensitivity to vibration from the engine, and the need for lubrication and maintenance.

Magnetic gearing in some form is known, and the concept of magnetic gearing may offer benefits in comparison to mechanical gearing, primarily as a result of a lack of physical contact between an input member and an output member. Magnetic planetary gearing in combination with an electric machine, which is also known, has an advantage in that one component of the three components of the magnetic planetary gearing may be the magnetic field produced by the electric machine stator and the other two components may be a first rotor and a second rotor of the electric machine. Magnetic gearing has received limited attention due to its limited torque density as compared to mechanical gearing.

SUMMARY

A transmission for transferring mechanical power between an input member and an output member is described, and includes a first synchronous electric machine including a first stator, a first distal rotor and a first proximal rotor, and a second synchronous electric machine including a second stator, a second distal rotor and a second proximal rotor. The input member rotatably couples to the first distal rotor and to the second proximal rotor and the output member rotatably couples to the second distal rotor and to the first proximal rotor. Mechanical power is transferrable between the input member and the output member without torque being applied by the first stator.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1-2 schematically shows a lever diagram for the all-magnetic single-mode compound power-split hybrid transmission described with reference to FIG. 1-1;

FIG. 2-1 schematically illustrates an embodiment of a powertrain system including an internal combustion engine that couples to a transmission to transfer mechanical power to an output member, wherein the transmission is a mixed magnetic and mechanical single-mode compound power-split hybrid transmission including a multi-rotor synchronous electric machine, a single rotor synchronous electric machine and a planetary gear set, in accordance with the disclosure;

FIG. 2-2 schematically shows a lever diagram for the mixed magnetic and mechanical single-mode compound power-split hybrid transmission described with reference to FIG. 2-1;

FIG. 3-1 schematically illustrates an embodiment of a powertrain system including an internal combustion engine that couples to a transmission to transfer mechanical power to an output member, wherein the transmission is a mixed magnetic and mechanical multi-mode input and compound power-split hybrid transmission including a multi-rotor synchronous electric machine, a single rotor synchronous electric machine, a planetary gear set, and output gearing and clutches in accordance with the disclosure;

FIG. 3-2 schematically shows a lever diagram for the mixed magnet and mechanical multi-mode input and compound power-split hybrid transmission including output gearing described with reference to FIG. 3-1;

FIG. 4-1 schematically illustrates an embodiment of a powertrain system including an internal combustion engine that couples to a transmission to transfer mechanical power to an output member, wherein the transmission is a mixed magnetic and mechanical multi-mode input and output power-split hybrid transmission including a multi-rotor synchronous electric machine, a single rotor synchronous electric machine, a planetary gear set, input clutches and output gearing and clutches in accordance with the disclosure;

FIG. 4-2 schematically shows a lever diagram for the mixed magnet and mechanical multi-mode input and output power-split hybrid transmission including input clutches and output gearing and clutches described with reference to FIG. 4-1;

DETAILED DESCRIPTION

Figure 1:
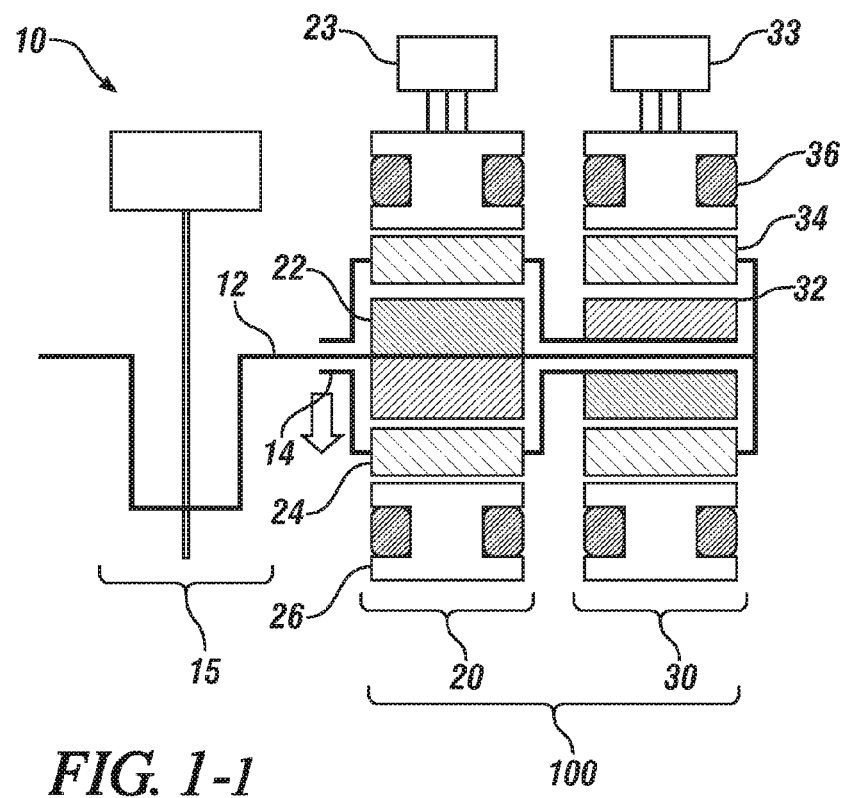
FIG. 1-1 schematically illustrates an embodiment of a powertrain system including an internal combustion engine that couples to a transmission to transfer mechanical power to an output member, wherein the transmission is an all-magnetic single-mode compound power-split hybrid transmission including first and second multi-rotor synchronous electric machines, in accordance with the disclosure.

Referring to the drawings, wherein like numerals indicate like or corresponding parts throughout the several views, FIG. 1-1 schematically illustrates a first embodiment of a powertrain system 10 including an internal combustion engine 16 that couples via an input member 12 to a transmission 100 including a first electric machine 20 and a second electric machine 30 to transfer mechanical power to an output member 14. The output member 14 may couple to a driveline to provide propulsion power when the transmission 100 is employed on a vehicle.

As used herein, the term 'clutch' refers to any selectively activatable device for transferring torque between two rotatable members, and may include hydraulically activated devices, mechanical plates, and the like. As used herein, the terms 'distal' and 'proximal' refer to locations of rotor elements relative to a stator for multi-rotor electric machines.

The transmission 100 is an all-magnetic single-mode compound power-split hybrid transmission 100, and the first and second electric machines 20, 30 are multi-rotor synchronous machines as described herein. The first electric machine 20 is a multi-rotor synchronous machine that includes a first stator 26, a first distal synchronous rotor 22 and a first proximal synchronous rotor 24, all of which are preferably coaxially arranged within a housing employing suitable bearings, end plates and related components. A first inverter 23 electrically connects to the first stator 26 to effect electric power transfer therewith to operate the first electric machine 20. The second electric machine 30 is a multi-rotor synchronous machine that includes a second stator 36, a second distal synchronous rotor 32 and a second proximal synchronous rotor 34, all of which are preferably coaxially arranged within a housing employing suitable bearings, end plates and related components. A second inverter 33 electrically connects to the second stator 36 to effect electric power transfer therewith to operate the second electric machine 30. Preferably, the first and second electric machines 20, 30 are arranged coaxially, although such arrangement is not required. Any suitable arrangement of the axes of the first and second electric machines 20, 30 may be employed.

The input member 12 rotatably couples to the first distal synchronous rotor 22 of the first electric machine 20 and to the second proximal synchronous rotor 34 of the second electric machine 30. The first and second electric machines 20, 30 are conjoined in that the first distal synchronous rotor 22 rotatably couples to the second proximal synchronous rotor 34 of the second electric machine 30 and the second distal synchronous rotor 32 of the second electric machine 30 rotatably couples to the first proximal synchronous rotor 24 of the first electric machine 20. The first proximal synchronous rotor 24 and the second distal synchronous rotor 32 rotatably couple to the transmission output member 14. The first and second electric machines 20, 30 are thus conjoined and compound-coupled.

Figures 1, 2:
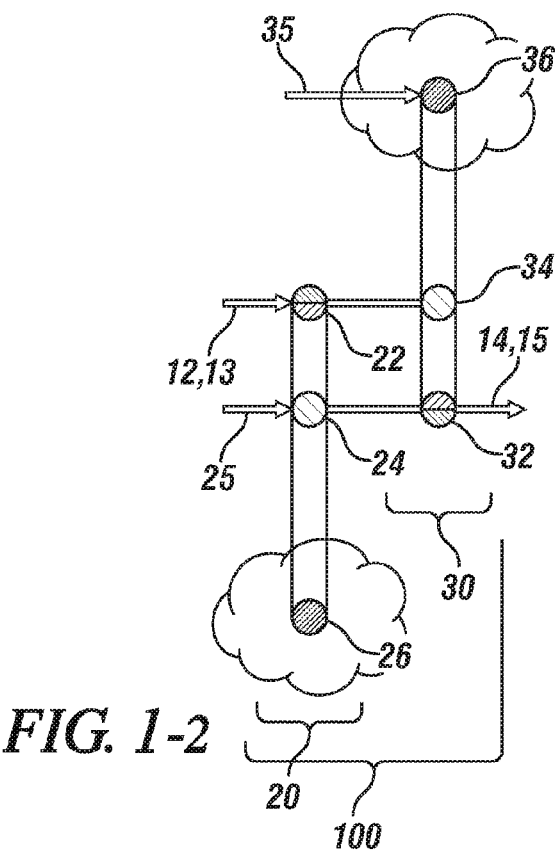
Figures 1, 2:
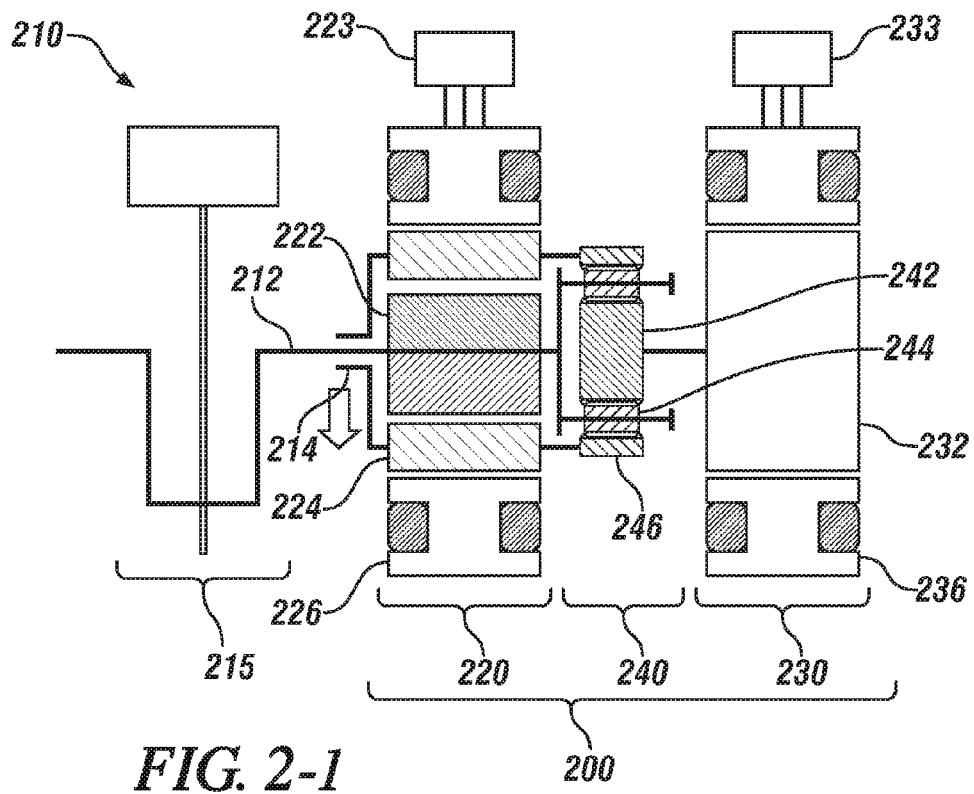
Figure 2:
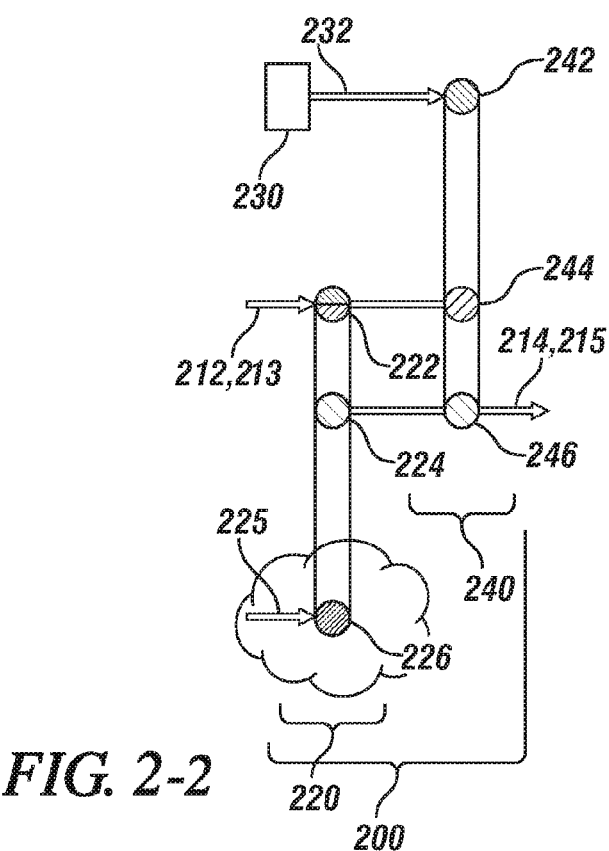

FIG. 1-2 schematically shows a lever diagram for the first embodiment of the transmission 100 including the first electric machine 20 including three nodes associated with the first stator 26, the first distal rotor 22 and the first proximal rotor 24. The second electric machine 30 includes three nodes associated with the second stator 36, the second distal rotor 32 and the second proximal rotor 34. As shown, the node representing the first distal rotor 22 couples to the node representing the second proximal rotor 34, and the node representing the second distal rotor 32 couples to the node representing the first proximal rotor 24, thus effecting compound coupling. Torques acting on the transmission 100 include a first reactive torque Tma 25, which is a reactive torque exerted by the first electric machine 20 at the first stator 26, and a second reactive torque Tmb 35, which is a reactive torque exerted by the second electric machine 30 at the second stator 36. Input torque Ti 13 from the input member 12 acts on the node representing the first distal rotor 22, and output torque To 15 to the output member 14 acts on the node representing the second distal rotor 32. Speeds at each of the three nodes along each lever may be calculated based upon the speeds of the other two nodes along that lever, which represents the magnetic gearing action among the magnetic fields produced by the stator, proximal synchronous rotor, and distal synchronous rotor of each of the multi-rotor synchronous electric machines. Furthermore, a torque equation can be developed for torque transfer through the transmission 100, as follows:

$$Ti+Tmb+Tma=To$$

Thus, torque and mechanical power transferred through the transmission 100 can include contributions from the engine 16, the first electric machine 20 and the second electric machine 30 to transfer mechanical power to the output member 14. Mechanical power can be transferred through the transmission 100 from the input member 12 to the output member 14 both by the first electric machine 20 without action from the second electric machine 30 and without action from the first electric machine 20 by the second electric machine 30. Input torque Ti 13 can be reacted both by the first reactive torque Tma 25 with the second reactive torque Tmb 35 being zero, and with the first reactive torque Tma 25 being zero by the second reactive torque Tmb 35. As such, mechanical power is transferrable between the input member 12 and the output member 14 without torque being applied by the first stator 26.

Furthermore, torque and mechanical power can be transferred by combined action of both electric machines 20 and 30 wherein the electric power generated by one of the first and second electric machines 20 and 30 supplies all of the electric power consumed by the other of the first and second electric machines 20 and 30. The ability to transfer torque from an input member 12 through the transmission 100 to an output member 14 by the individual action of two electric machines 20 and 30 and by the combined action of two electric machines 20 and 30 together is characteristic of compound power-split operation.

FIG. 2-1 schematically illustrates a second embodiment of a powertrain system 210 including an internal combustion engine 216 that couples via an input member 212 to a mixed magnetic and mechanical single mode compound power-split transmission 200 including a first electric machine 220, a second electric machine 230 and a planetary gear set 240 for transferring mechanical power to an output member 214. The output member 214 may couple to a driveline to provide propulsion power when the transmission 200 is employed on a vehicle. The transmission 200 is a mixed magnet and mechanical single-mode compound power-split hybrid device, with the first electric machine 220 being a multi-rotor synchronous machine and the second electric machine 230 being a single rotor synchronous machine. The first electric machine 220 includes a first stator 226, a first distal synchronous rotor 222 and a first proximal synchronous rotor 224, all of which are preferably coaxially arranged within a housing employing suitable bearings, end plates and related components. A first inverter 223 electrically connects to the first stator 226 to effect electric power transfer therewith to operate the first electric machine 220. The planetary gear set 240 includes a ring gear 246, a plurality of planet gears and carrier 244, and a sun gear 242. The second electric machine 230 includes a second stator 236 and a synchronous rotor 232, which are preferably coaxially arranged within a housing employing suitable bearings, end plates and related components. A second inverter 233 electrically connects to the second stator 236 to effect electric power transfer therewith to operate the second electric machine 230. Preferably, the first and second electric machines 220, 230 and the planetary gear set 240 are arranged coaxially, although such arrangement is not required. Any suitable arrangement of the axes of the first and second electric machines 220, 230 and planetary gear set 240 may be employed.

The input member 212 rotatably couples to the first distal synchronous rotor 222 of the first electric machine 220 and to the carrier 244 of the planetary gear set 240. The synchronous rotor 232 of the second electric machine 230 rotatably couples to the sun gear 242 of the planetary gear 240. The ring gear 246 of the planetary gear set 240 rotatably couples to the first proximal synchronous rotor 224, which couples to the transmission output member 214. The first electric machine 220 and the planetary gear set 240 are thus compound-coupled.

FIG. 2-2 schematically shows a lever diagram for the second embodiment of the transmission 100 including the first electric machine 220 including three nodes associated with the first stator 226, the first distal rotor 222 and the first proximal rotor 224 and the planetary gear set 240 including the sun gear 242, carrier 244 and ring gear 246. As shown the node representing the first distal rotor 222 couples to the node representing the carrier 244, and the node representing the second distal rotor 224 couples to the node representing the ring gear 246. The rotor 232 of the second electric machine 230 couples to the node representing the sun gear 242. Torques acting on the transmission 200 include a first reactive torque Tma 225, which is reactive torque exerted by the first electric machine 220 at the first stator 226, and a second reactive torque Tmb 235, which is torque exerted by the second electric machine 230 at the sun gear 242. Input torque Ti 213 from the input member 212 acts on the node representing the first distal rotor 222, and output torque To 215 to the output member 214 acts on the node representing the ring gear 246. Speeds at each of the nodes may be calculated based upon speeds at the other nodes. Furthermore, a torque equation can be developed for torque transfer through the transmission 200, as follows:

$$Ti+Tmb+Tma=To$$

Thus, torque and mechanical power transferred through the transmission 200 can include contributions from the engine 215, the first electric machine 220 and the second electric machine 230 to transfer mechanical power to the output member 214. Like the transmission 100 shown schematically in FIG. 1-2, the transmission 200 can transfer torque and mechanical power from the input member 212 to the output member 214 both by the action of the first electric machine 220 and without the action of the first electric machine 220. As such, mechanical power is transferrable between the input member 212 and the output member 214 without torque being applied by the first stator 226. The transmission 200 shown schematically in FIG. 2-2 can transfer torque and mechanical power from the input member 212 to the output member 214 by the action of the second electric machine 230 providing the second reactive torque Tmb 235 on the sun gear 242 of the planetary gear set 240.

Figures 1, 3:
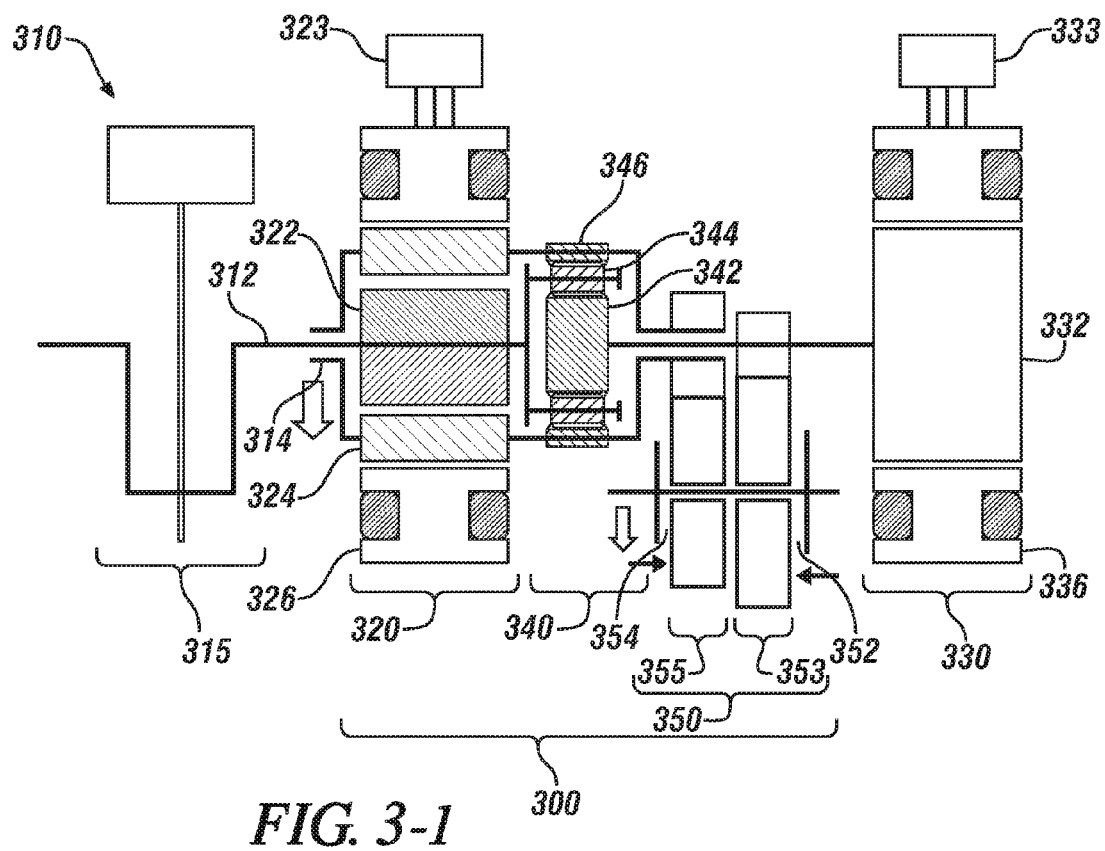
Figures 2, 3:
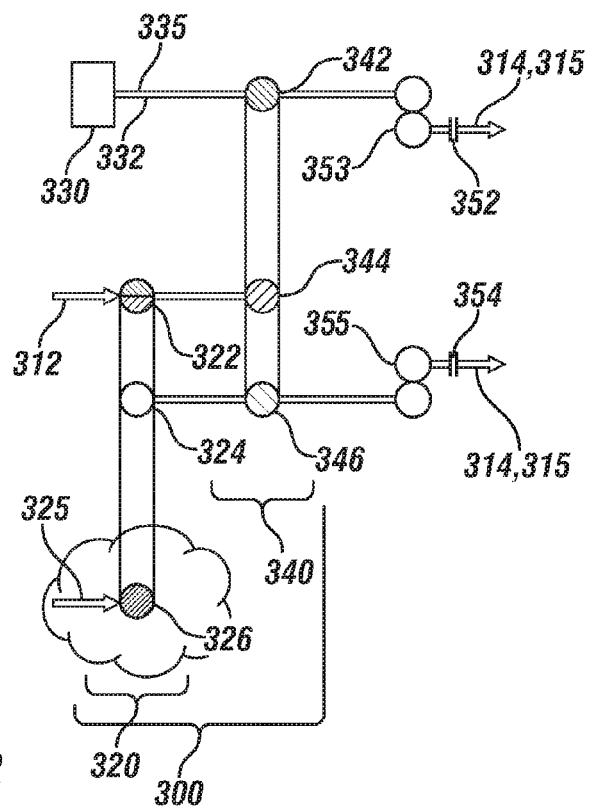

FIG. 3-1 schematically illustrates a third embodiment of a powertrain system 310 including an internal combustion engine 316 that couples via an input member 312 to a mixed magnetic and mechanical multi-mode input and compound-split transmission 300 including a first electric machine 320, a second electric machine 330 and a planetary gear set 340 for transferring mechanical power to an output member 314. This embodiment includes an output gearbox 350 that may selectably couple the output member 314 to different members of the planetary gear set 340. The output member 314 may couple to a driveline to provide propulsion power when the transmission 300 is employed on a vehicle. The transmission 300 is a mixed magnetic and mechanical multi-mode input and compound power-split hybrid transmission 300, with the first electric machine 320 being a multi-rotor synchronous machine and the second electric machine 330 being a single rotor synchronous machine.

The first electric machine 320 includes a first stator 326, a first distal synchronous rotor 322 and a first proximal synchronous rotor 324, all of which are preferably coaxially arranged within a housing employing suitable bearings, end plates and related components. A first inverter 323 electrically connects to the first stator 326 to effect electric power transfer therewith to operate the first electric machine 320. The planetary gear set 340 includes a ring gear 346, a plurality of planet gears and carrier 344, and a sun gear 342. The second electric machine 330 is a single-rotor synchronous machine that includes a second stator 336 and a synchronous rotor 332, which are preferably coaxially arranged within a housing employing suitable bearings, end plates and related components. A second inverter 333 electrically connects to the second stator 336 to effect electric power transfer therewith to operate the second electric machine 330. Preferably, the first and second electric machines 320, 330 and the planetary gear set 340 are arranged coaxially, although such arrangement is not required. Any suitable arrangement of the axes of the first and second electric machines 320, 330 and planetary gear set 340 may be employed. The output gearbox 350 includes a first gear train 353 and a second gear train 355. The first gear train 353 rotatably couples the sun gear 342 of the planetary gear set 340 and the synchronous rotor 332 of the second electric machine 330 to the output member 314 by activating a first clutch 352. The second gear train 355 rotatably couples the ring gear 346 of the planet gear set 340 and thereby the first proximal synchronous rotor 324 of the first electric machine 320 to the output member 314 by activating a second clutch 354. In one embodiment, the first gear train 353 transfers mechanical power to the output member 314 at an underdrive gear ratio and the second gear train 355 transfers mechanical power to the output member 314 at an overdrive gear ratio. Alternatively, the first and second gear trains 353, 355 may transfer mechanical power at any suitable gear ratio.

The input member 312 rotatably couples to the first distal synchronous rotor 322 of the first electric machine 320 and to the carrier 344 of the planetary gear set 340. The synchronous rotor 332 of the second electric machine 330 rotatably couples to the sun gear 342 of the planetary gear 340. The first proximal synchronous rotor 324 rotatably couples to the ring gear 346 of the planetary gear set 340, which couples to the transmission output member 314. The first electric machine 320 and the planetary gear set 340 are thus compound-coupled.

FIG. 3-2 schematically shows a lever diagram for the third embodiment of the transmission 100 including the first electric machine 320. The lever diagram includes three nodes associated with the first stator 326, the first distal rotor 322 and the first proximal rotor 324, and the planetary gear set 340 including the sun gear 342, carrier 344 and ring gear 346. As shown, the node representing the first distal rotor 322 couples to the node representing the carrier 344, and the node representing the second distal rotor 324 couples to the node representing the ring gear 346. The rotor 332 of the second electric machine 330 couples to the node representing the sun gear 342. Torques acting on the transmission 300 include a first reactive torque Tma 325, which is reactive torque exerted by the first electric machine 320 at the first stator 326, and a second reactive torque Tmb 335, which is torque exerted by the second electric machine 330 at the sun gear 342. Input torque Ti 313 from the input member 312 acts on the node representing the first distal rotor 322. Output torque To 315 to the output member 314 may act through either the node representing the ring gear 346 by activation of the second clutch 354 or the node representing the sun gear 342 by activation of the first clutch 352. It is appreciated that the magnitude of the output torque To 315 to the output member 314 acting through the node representing the ring gear 346 by activation of the second clutch 354 may differ from the magnitude of the output torque To 315 to the output member 314 acting through the node representing the sun gear 342 by activation of the first clutch 352. Again, speeds at each of the nodes may be calculated based upon speeds at the other nodes. Furthermore, a torque equation can be developed for torque transfer through the transmission 300, as follows:

$$Ti+Tmb+Tma=To$$

Thus, torque and mechanical power transferred through the transmission 300 can include contributions from the engine 316, the first electric machine 320 and the second electric machine 330 to transfer mechanical power to the output member 314. Torque and mechanical power may be transmitted through the transmission from the input member 312 to the output member 314 in an input power-split mode by activation of the first clutch 352, and in a compound power-split mode by activation of the second clutch 354. In the input power-split mode, torque and mechanical power are transferred by action of the first electric machine 320; the rotor 332 of the second electric machine 330 is coupled for rotation with the output member 314 through the first clutch 352 and the first gear train 353, and the second reactive torque Tmb 335 from the second electric machine 330 cannot react input torque Ti 313. In the compound power-split mode, torque and mechanical power can be transferred by action of the first electric machine 320 and without action of the first electric machine 320 by using the second electric machine 330 to provide reaction torque Tmb 335 on the sun gear 342 of the planetary gear set 340 and by combined action of the first and second electric machines 320 and 330 and the planetary gear set 340. As such, mechanical power is transferrable between the input member 312 and the output member 314 without torque being applied by the first stator 326.

Figures 1, 4:
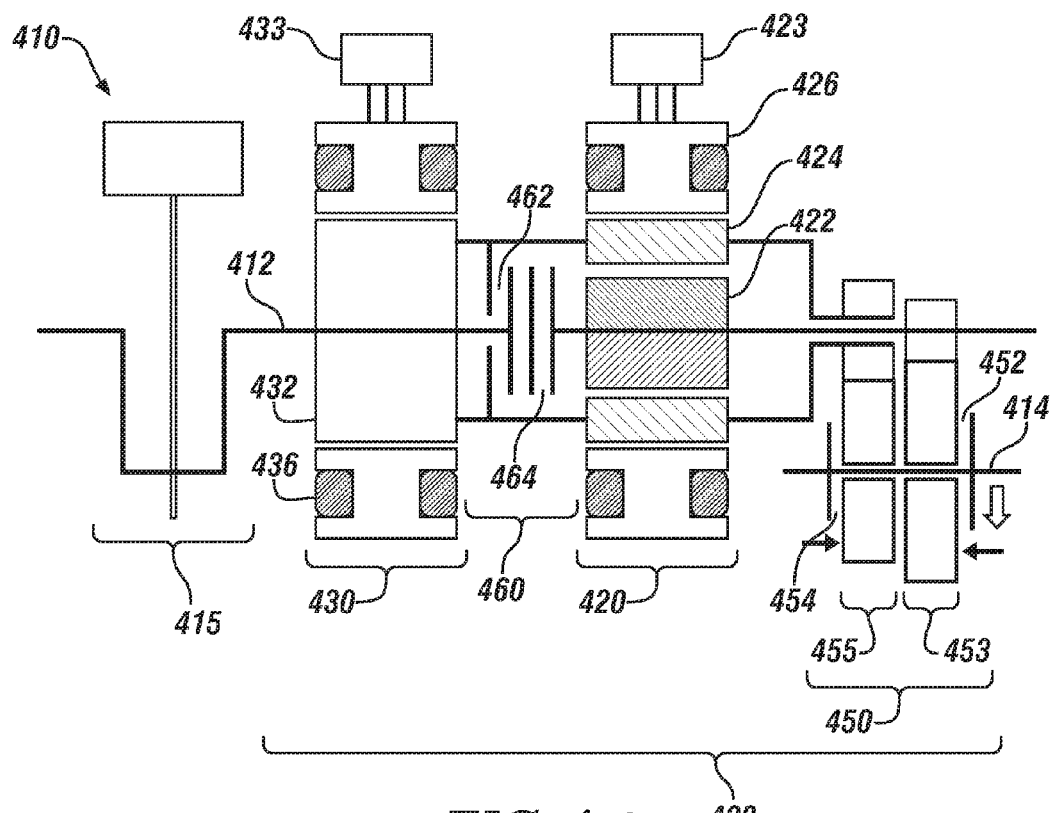
Figures 2, 4:
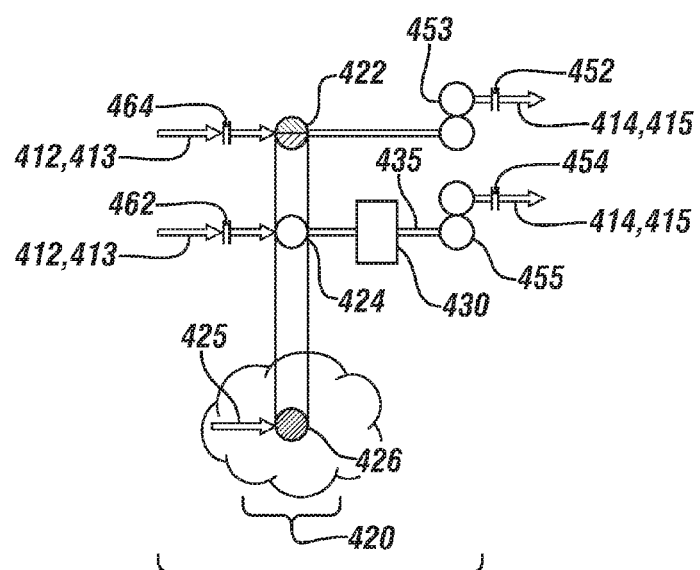

FIG. 4-1 schematically illustrates a fourth embodiment of a powertrain system 410 including an internal combustion engine 416 that couples via an input member 412 to a mixed magnetic and mechanical multi-mode input and output power-split transmission 400 including a first electric machine 420 and a second electric machine 430 for transferring mechanical power to an output member 414. This embodiment includes an input-split clutch arrangement 460 and an output-split gearbox 450 as described herein. The output member 414 may couple to a driveline to provide propulsion power when the transmission 400 is employed on a vehicle. The transmission 400 is a mixed magnetic and mechanical multi-mode input and output power-split hybrid transmission 400, with the first electric machine 420 being a multi-rotor synchronous machine.

The first electric machine 420 includes a first stator 426, a first distal synchronous rotor 422 and a first proximal synchronous rotor 424, all of which are preferably coaxially arranged within a housing employing suitable bearings, end plates and related components. A first inverter 423 electrically connects to the first stator 426 to effect electric power transfer therewith to operate the first electric machine 420. The second electric machine 430 includes a second stator 436 and a synchronous rotor 432, which are preferably coaxially arranged within a housing employing suitable bearings, end plates and related components. A second inverter 433 electrically connects to the second stator 436 to effect electric power transfer therewith to operate the second electric machine 430. Preferably, the first and second electric machines 420, 430 are arranged coaxially, although such arrangement is not required. Any suitable arrangement of the axes of the first and second electric machines 420, 430 may be employed. The output gearbox 450 includes a first gear train 453 and a second gear train 455. The first gear train 453 rotatably couples the first distal synchronous rotor 422 of the first electric machine 420 and part of the input clutch arrangement 460 to the output member 414 by activating a first clutch 452. The second gear train 455 rotatably couples the first proximal synchronous rotor 424 of the first electric machine 420 and thereby part of the input clutch arrangement 460 and the synchronous rotor 432 of the second electric machine 430 to the output member 414 by activating a second clutch 454. The input clutch arrangement 460 includes a third clutch 462 and a fourth clutch 464. The third clutch 462 rotatably couples the input member 412 to the synchronous rotor 432 of the second electric machine 430 and the first proximal synchronous rotor 424 of the first electric machine 420 when activated. The fourth clutch 464 rotatably couples the input member 412 to the first distal synchronous rotor 422 of the first electric machine 420 and to the first gear train 453 when activated. In one embodiment, the first gear train 453 transfers mechanical power to the output member 414 at an underdrive gear ratio and the second gear train 455 transfers mechanical power to the output member 414 at an overdrive gear ratio. Alternatively, the first and second gear trains 453, 455 may transfer mechanical power at any suitable gear ratio. Alternatively, the first and second clutches 452 and 454 may transfer mechanical power to an output member 414 in direct drive.

The transmission 400 may operate an input power-split mode, an output power-split mode, and in a fixed-ratio state. In the input power-split mode, the input member 412 rotatably couples to the first distal synchronous rotor 422 of the first electric machine 420 using the fourth clutch 464, and the output member 414 is connected with the first proximal synchronous rotor 424 of the first electric machine 420 and the synchronous rotor 432 of the second electric machine 430 using the second clutch 454 and the second gear train 455. In the output power-split mode, the input member 412 rotatably couples to the first proximal rotor 424 of the first electric machine 420 and to the rotor 432 of the second electric machine 430, and the output member 414 is connected with the first distal synchronous rotor 422 of the first electric machine 420 using the first clutch 452 and the first gear train 453. In a fixed-ratio state, the input member 412 couples to a member which is also connected with the output member 414, either by the first and fourth clutches 452 and 464 or by the second and third clutches 454 and 462.

FIG. 4-2 schematically shows a lever diagram for the fourth embodiment of the transmission 400 including the first electric machine 420 and the second electric machine 430. The lever diagram includes three nodes associated with the first stator 426, the first distal rotor 422 and the first proximal rotor 424. As shown the node representing the first distal rotor 422 selectively couples to the input member 412 via activation of the fourth clutch 464, or alternatively the node representing the first proximal rotor 424 selectively couples to the input member 412 via activation of the third clutch 462. The node representing the first proximal rotor 424 couples to the rotor 432 of the second electric machine 430, which selectively couples to the output member 414 via the second gear train 455 by activation of the second clutch 454. The node representing the first distal rotor 422 selectively couples to the output member 414 via the first gear train 453 by activation of the first clutch 453.

Torques acting on the transmission 400 include a first reactive torque Tma 425, which is reactive torque exerted by the first electric machine 420 at the first stator 426, and a second reactive torque Tmb 435, which is torque exerted by the second electric machine 430. Input torque Ti 413 from the input member 412 acts on the node representing the first distal rotor 422 by activating the fourth clutch 464, or acts on the node representing the first proximal rotor 424 by activating the third clutch 462.

Output torque To 415 to the output member 414 may act through either the node representing the first proximal rotor 424 by activation of the second clutch 454 or the node representing the first distal rotor 422 by activation of the first clutch 452. It is appreciated that the magnitude of the output torque To 415 to the output member 414 acting through the node representing a ring gear 446 by activation of the second clutch 454 may differ from the magnitude of the output torque To 415 to the output member 414 acting through the node representing a sun gear 442 by activation of the first clutch 452. Again, speeds at each of the nodes may be calculated based upon speeds at the other nodes. Furthermore, a torque equation can be developed for torque transfer through the transmission 400, as follows:

$$Ti+Tmb+Tma=To$$

Thus, mechanical power transferred through the transmission 400 can include contributions from the engine 415, the first electric machine 420 and the second electric machine 430 to transfer mechanical power to the output member 414. In both the input-split mode and the output-split mode, input torque Ti 413 and mechanical power from the input member 412 are transmitted to the output member 414 by reactive torque Tma 425 exerted by the first electric machine 420. In a fixed-ratio state, input torque Ti 413 and mechanical power from the input member 412 can be transmitted to the output member 414 through clutches and a gear train, as described above, without action from the first electric machine 420. As such, mechanical power is transferrable between the input member 412 and the output member 414 without torque being applied by the first stator 426.

Figure 5:
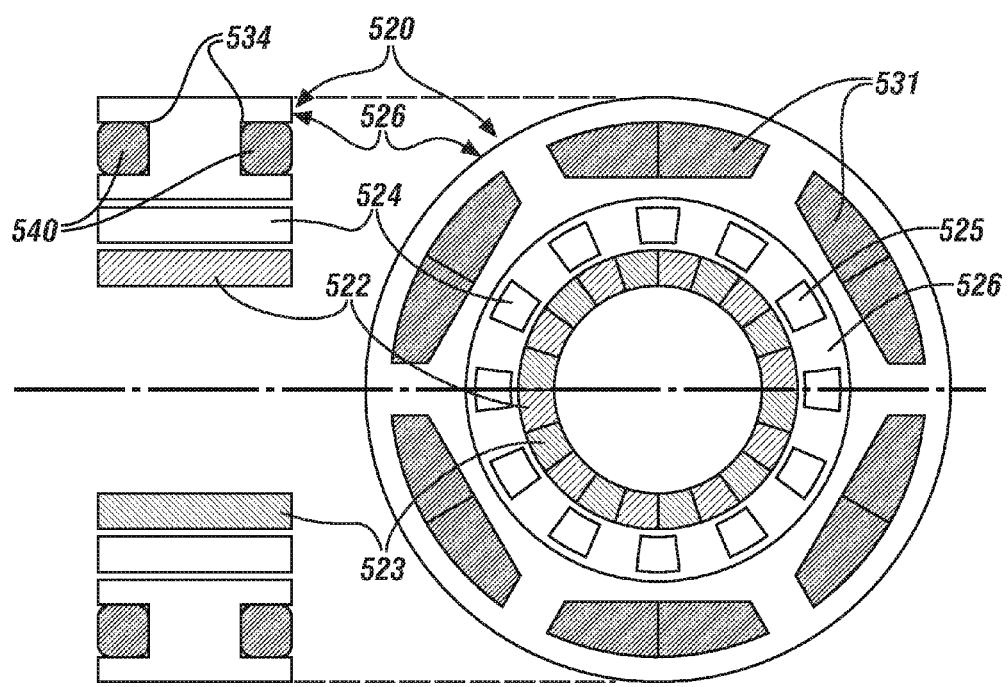
FIG. 5 schematically shows a cross-sectional end view and a corresponding side view of an embodiment of a multi-rotor synchronous electric machine including a coaxially arranged stator, distal synchronous rotor and proximal synchronous rotor, in accordance with the disclosure.

FIG. 5 schematically shows a cross-sectional end view and a corresponding side view of an embodiment of a multi-rotor synchronous electric machine 520. The electric machine 520 includes a stator 530, a distal synchronous rotor 522 and a proximal synchronous rotor 524, all of which are preferably coaxially arranged within a housing employing suitable bearings, end plates and related components. As shown, the proximal synchronous rotor 524 is annular to the distal synchronous rotor 522, and both are annular to the stator 530. Elements such as the housing, bearings, end plates and related components are known and not shown in order to facilitate illustration of the other elements. The stator 530 is fabricated as an annular, hollow cylindrical device that is disposed radially so as to surround the distal synchronous rotor 522 and the proximal synchronous rotor 524. The stator 530 includes a stator core 532 on which a multi-phase electrical coil 540 mounts. Design elements related to multi-phase electrical coils 540 are known and not described herein. The stator core 532 may be formed by pressing and sintering a powder composed of iron particles that are coated with a structural and electrically-insulating compound. The stator core 532 has a plurality of slots 531 formed in the radially inner surface thereof. The slots 531 extend in the axial direction of the stator core 532 so as to axially penetrate the stator core 532 and are spaced from one another at equal intervals in the circumferential direction of the stator core 532. Moreover, for each of the slots 531, the depth direction of the slot 531 coincides with a radial direction of the stator core 532. In one embodiment, and as shown, there are six slots 531. The multi-phase electrical coil 540 is fabricated from a plurality of electric wires mounted on the stator core 532. Preferably, the longitudinal ends of the stator core 532 include recessed portions 534, thus permitting the end turns of the multi-phase electrical coil 540 to be submerged therein. This arrangement permits the stator 530 to actively electrically engage the rotors 522, 524 to effect magnetic gearing across its entire length, thus facilitating a reduced length of the electric machine 520, and a corresponding reduction in packaging volume. The distal synchronous rotor 522 is fabricated employing a plurality of surface-mounted permanent magnets 523 that form a plurality of magnetic poles on its radially outer periphery facing the proximal synchronous rotor 524. The polarities of the magnetic poles alternate between north and south in the circumferential direction of the distal synchronous rotor 522. The quantity of surface-mounted permanent magnets 523 and corresponding magnetic poles can be suitably set according to the design specification of the electric machine 520. The proximal synchronous rotor 524 is a cylindrical device that is fabricated employing a plurality of iron bars 525 mounted on a rigid frame 526. The iron bars 525 form a plurality of magnetic poles on the radially outer periphery of the rotor 524 facing the radially inner periphery of the stator 530 and a plurality of magnetic poles on its radially inner periphery facing the distal synchronous rotor 522 when magnetic fields are applied by the distal synchronous rotor 522 and by the stator 530. The polarities of the magnetic poles of the iron bars 525 alternate between north and south in the circumferential direction of the rotor 524. The quantity of the iron bars 525 can be suitably set according to the design specification of the electric machine 520 and differs from the quantity of surface-mounted permanent magnets 523 on the distal synchronous rotor 522 and from the quantity of magnetic poles produced by the stator 530, so that the rotation of the proximal synchronous rotor 524 interacts with the rotation of both the magnetic poles produced by surface-mounted permanent magnets 523 on the distal synchronous rotor 522 and the magnetic poles produced by multi-phase electrical winding 540 and the core 532 of the stator 530.

In other words, the iron bars 525 of the proximal synchronous rotor 524 are attracted for rotation to those circumferential places between the distal synchronous rotor 522 and the stator 530 where the strongest magnetic fields are produced by the combination of the permanent magnets of the distal synchronous rotor 522 and the electrical coil 540 and core 532 of the stator 530. The portion of action, i.e. torque, upon the proximal synchronous rotor 524 contributed by the distal synchronous rotor 522 results in an equal and opposite reaction, i.e. torque, upon the distal synchronous rotor 522, and the portion of action, i.e. torque, upon the proximal synchronous rotor 524 contributed by the stator 530 results in an equal and opposite reaction, i.e. torque upon the stator 530. An embodiment of the multi-rotor synchronous electric machine 520 described herein may replace a combination of an electric motor/generator and a planetary gear set in a power splitting arrangement, wherein the magnetic field of the stator 530 is equivalent in effect to a conventional electric machine attached to the sun gear in the planetary gear set, the proximal synchronous rotor 524 is equivalent in effect to a carrier of planets that each mesh with both a sun gear and a ring gear, and the distal synchronous rotor 522 is equivalent in effect to the ring gear in the planetary gear set. Such an arrangement may provide benefits related to reduced audible noise and vibration, reduced maintenance, improved reliability, flexibility in practical effective ratios without added components, and others as compared to a mechanical planetary gear set and a conventional single-rotor electric machine in a power-split transmission.

Figure 6:
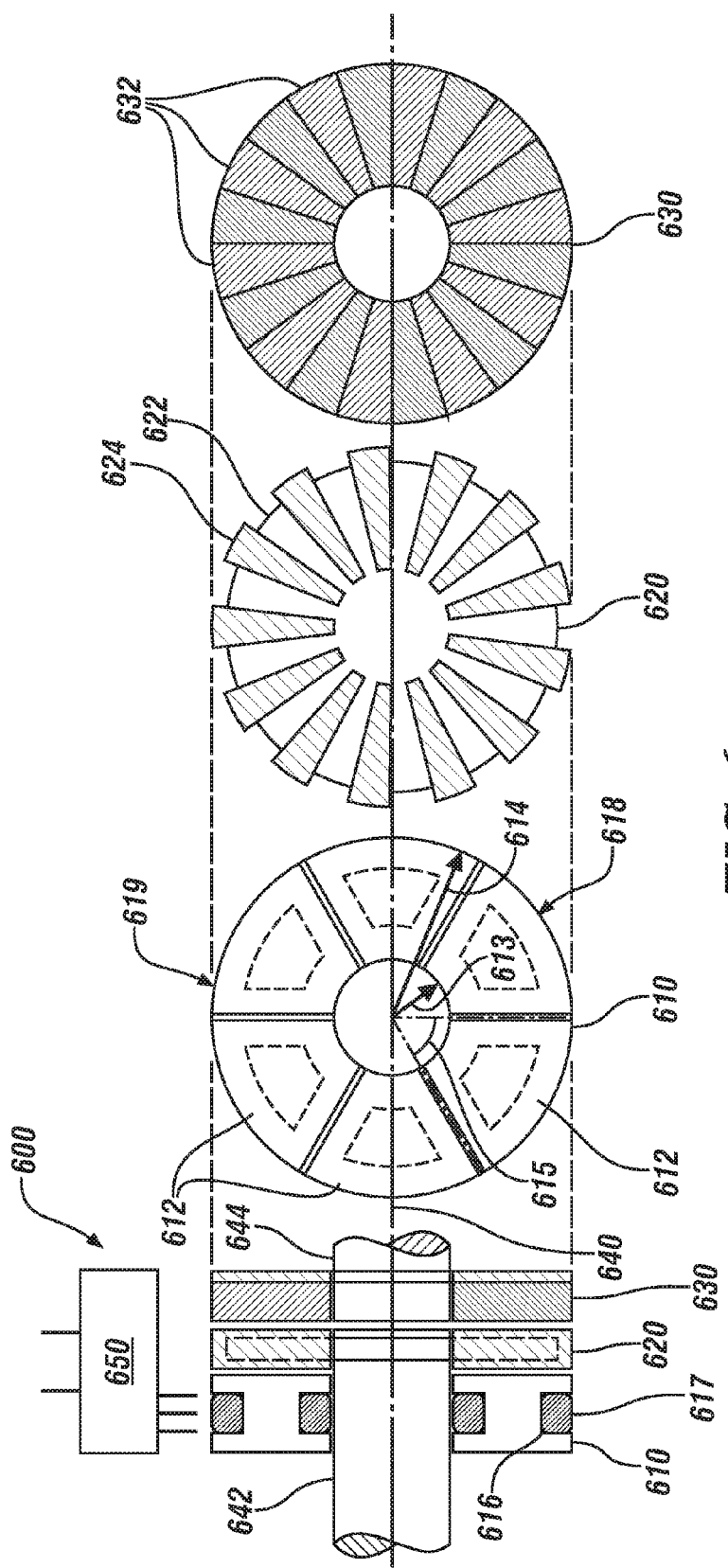
FIG. 6 schematically shows a plurality of cross-sectional end views and a corresponding side view of an embodiment of a multi-rotor synchronous electric machine including a longitudinally-arranged stator, proximal synchronous rotor and distal synchronous rotor, in accordance with the disclosure.

FIG. 6 schematically shows a plurality of cross-sectional end views and a corresponding side view of an embodiment of a multi-rotor synchronous electric machine 600. The electric machine 600 includes a stator 610, a first, proximal synchronous rotor 620 and a second, distal synchronous rotor 630, all of which are preferably longitudinally arranged in series and are coaxial about an axis 640 within a housing employing suitable bearings, end plates and related components. As shown, the stator 610, the proximal synchronous rotor 620 and the distal synchronous rotor 630 have a common outer diameter. Elements such as the housing, bearings, end plates and related components are known and not shown in order to facilitate illustration of the other elements.

The first, proximal synchronous rotor 620 rotatably couples to a transmission output member via a first coaxial member 642, and the second, distal synchronous rotor 630 rotatably couples to a transmission output member via a second coaxial member 644 in one embodiment.

The stator 610 is a disc-shaped element that includes a plurality of radially arranged core elements 612, with the quantity of the core elements 612 being a multiple of the number of phases of the electric machine 600. As shown, there is a quantity of six core elements 612 and the electric machine 600 is a three-phase machine. Each of the core elements 612 is an annular sector defined by a central angle 615, an inner radius 613 and an outer radius 614, wherein the central angle 615 is defined by 360° divided by the quantity of the core elements 612. Each of the core elements 612 has a recessed portion 616 formed around its outer periphery, around which conductive wire 617 is wrapped in a continuous manner, forming an electrical coil 618. The plurality of radially arranged core elements 612 each having an electrical coil 618 forming a multi-phase electrical winding 619 that electrically connects to an inverter circuit 650. Design elements related to multi-phase electrical windings 619 are known and not described herein. The stator 610 fixedly attaches to an outer housing element and has an inner opening through which one or both of the rotating members 642, 644 passes.

The proximal synchronous rotor 620 is a disc-shaped element that rotatably mounts on the first rotating member 642, and preferably includes a ferrous core portion 622 on which a plurality of radially-oriented magnetic elements 624 are attached uniformly about its periphery. The distal synchronous rotor 630 is a disc-shaped element that rotatably mounts on the second rotating member 644, and preferably includes a ferrous core portion 622 on which a plurality of contiguous radially-oriented magnetic elements 624 are attached.

An embodiment of the multi-rotor synchronous electric machine 620 described herein may replace a combination of an electric motor/generator and a planetary gear set in a power splitting arrangement, wherein the magnetic field of a stator 626 can act as a conventional electric machine attached to the sun gear in the planetary gear set, the proximal synchronous rotor 624 can act as the carrier of planet gears that each mesh with both a sun gear and a ring gear, and the distal synchronous rotor 630 can act as the ring gear in the planetary gear set. An embodiment of the multi-rotor synchronous electric machine 620 described herein may have an advantage in the size and shape of component for these functions, particularly in a power-split transmission.

Embodiments of the powertrain system described include a power-split transmission including input and output members and a multi-rotor electric machine with a stator, a first, proximal synchronous rotor and a second, distal synchronous rotor. Mechanical power may be transferrable between input and output members using a reactive torque that is applied by the stator of the multi-rotor electric machine. Mechanical power is also transferrable between the input and output members independent of that torque, including in embodiments incorporating a second electric machine, planetary gearing, clutches to achieve multi-mode operation, and combinations thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A transmission for transferring mechanical power between an input member and an output member, comprising:
  a first synchronous electric machine including a first stator, a first distal rotor and a first proximal rotor; and
  a second synchronous electric machine including a second stator, a second distal rotor and a second proximal rotor;
  wherein the input member rotatably couples to the first distal rotor and to the second proximal rotor;
  wherein the output member rotatably couples to the second distal rotor and to the first proximal rotor; and
  wherein mechanical power is transferrable between the input member and the output member without torque being applied by the first stator.

2. The transmission of claim 1, wherein mechanical power output transferred to the output member is based upon a mechanical power input to the input member, a power input to the first electric machine through the first stator, and a power input to the second electric machine through the second stator.

3. The transmission of claim 2, wherein the power input to the first electric machine and the power input to the second electric machine comprise reactive torques.

4. The transmission of claim 1, wherein the first stator further comprises a stator core and an electrical coil, and wherein the stator core includes longitudinal ends including recessed portions into which end turns of the electrical coil are submerged.

5. A transmission for transferring mechanical power between an input member and an output member, comprising:
  a multi-rotor electric machine including a first stator, a first distal rotor and a first proximal rotor;

a second electric machine including a second stator and a second rotor; and a planetary gear set including a ring gear, a plurality of planet gears coupled to a carrier, and a ring gear;

wherein the input member rotatably couples to the first distal rotor and rotatably couples to the carrier of the planetary gear;

wherein the second rotor of the second electric machine rotatably couples to the sun gear;

wherein the ring gear rotatably couples to the first proximal rotor of the first electric machine and rotatably couples to the output member; and wherein mechanical power is transferrable between the input member and the output member without torque being applied by the first stator.

6. The transmission of claim 5, wherein the ring gear rotatably couples via an output-split gearbox to the output member.

7. The transmission of claim 6, wherein the output-split gearbox further comprises:
- a first gear train rotatably coupling the second rotor of the second electric machine to the output member via activation of a first clutch, and
- a second gear train rotatably coupling the first proximal rotor of the first electric machine to the output member via activation of a second clutch.

8. The transmission of claim 6, further comprising:
- an input-split clutch arrangement including third clutch and a fourth clutch;
- wherein the input member rotatably couples to the first distal rotor and the second rotor when the fourth clutch is activated; and
- wherein the input member rotatably couples to the first proximal rotor when the third clutch is activated.

9. A transmission for transferring mechanical power between an input member and an output member, comprising:
- a first multi-rotor electric machine including a first stator, a first distal synchronous rotor and a first proximal synchronous rotor;
- wherein the input member rotatably couples to one of the first distal synchronous rotor and the first proximal synchronous rotor and the output member rotatably couples to the other of the first distal synchronous rotor and the first proximal synchronous rotor;
- wherein mechanical power is transferrable between the input member and the output member using a torque applied by the first stator; and
- wherein mechanical power is transferrable between the input member and the output member without a torque being applied by the first stator.

10. The transmission of claim 9, further comprising:
- a second multi-rotor electric machine including a second stator, a second distal synchronous rotor and a second proximal synchronous rotor;
- wherein the input member rotatably couples with one of the second distal synchronous rotor and the second proximal synchronous rotor and the output member rotatably couples with the other of the second distal synchronous rotor and the second proximal synchronous rotor; and
- wherein mechanical power is transferrable between the input member and the output member using a reactive torque applied by the second stator.

11. The transmission of claim 9, further comprising:
- a planetary gear set comprising a sun gear member, a planet carrier member, and a ring gear member;
- a second electric machine with a second stator and a rotor coupled to a first member of the planetary gear set;
- wherein the input member is rotatably coupled with one of the second and third members of the planetary gear set and the output member is rotatably coupled with the other of the second and third members of the planetary gear set; and
- wherein mechanical power is transferrable between the input member and the output member using a torque applied by the second stator.

12. The transmission of claim 9, further comprising:
- a first clutch and a second clutch;
- wherein mechanical power is transferrable between the input member and the output member using the first clutch and the second clutch.

* * * * *